US008077617B2

(12) United States Patent
Teener

(10) Patent No.: US 8,077,617 B2
(45) Date of Patent: Dec. 13, 2011

(54) METHOD AND SYSTEM FOR PROXY A/V BRIDGING ON AN ETHERNET SWITCH

(75) Inventor: Michael Johas Teener, Santa Cruz, CA (US)

(73) Assignee: Broadcom Corporation, Irvine, CA (US)

( * ) Notice: Subject to any disclaimer, the term of this patent is extended or adjusted under 35 U.S.C. 154(b) by 212 days.

(21) Appl. No.: 12/038,099

(22) Filed: Feb. 27, 2008

(65) Prior Publication Data

US 2008/0285574 A1 Nov. 20, 2008

Related U.S. Application Data

(60) Provisional application No. 60/917,870, filed on May 14, 2007.

(51) Int. Cl.
*H04L 12/56* (2006.01)
(52) U.S. Cl. ........................................ 370/232; 370/401
(58) Field of Classification Search ........................ None
See application file for complete search history.

(56) References Cited

U.S. PATENT DOCUMENTS

| 5,959,968 A * | 9/1999 | Chin et al. ..................... 370/216 |
|---|---|---|
| 6,760,766 B1 | 7/2004 | Sahlqvist |
| 7,099,277 B2 | 8/2006 | Sahinoglu |
| 2002/0097733 A1* | 7/2002 | Yamamoto ..................... 370/412 |
| 2003/0095553 A1 | 5/2003 | Shiomoto et al. |
| 2003/0156543 A1 | 8/2003 | Sahinoglu |
| 2006/0153228 A1* | 7/2006 | Stahl et al. .................... 370/466 |
| 2006/0206513 A1* | 9/2006 | Belyavsky ..................... 707/102 |
| 2006/0268903 A1* | 11/2006 | Feng .............................. 370/401 |
| 2007/0198900 A1* | 8/2007 | Ryu et al. ....................... 714/776 |
| 2007/0206513 A1* | 9/2007 | Cho et al. ...................... 370/254 |
| 2007/0263554 A1 | 11/2007 | Finn |
| 2007/0280102 A1 | 12/2007 | Vasseur |
| 2008/0159304 A1 | 7/2008 | Ozugar |
| 2008/0232243 A1 | 9/2008 | Oren |
| 2008/0285459 A1 | 11/2008 | Diab |
| 2008/0285460 A1 | 11/2008 | Oren et al. |
| 2008/0288638 A1 | 11/2008 | Diab et al. |

OTHER PUBLICATIONS

Michael Johas Teener, AV Bridging and Ethernet AV™, 67th IETF Meeting, San Diego, CA, USA, Nov. 5-10, 2006.

* cited by examiner

*Primary Examiner* — Chirag Shah
*Assistant Examiner* — Steve Young
(74) *Attorney, Agent, or Firm* — McAndrews, Held & Malloy, Ltd.

(57) ABSTRACT

Aspects of a system for proxy A/V bridging on an Ethernet switch may include an AV switch enables reception of incoming PDUs from a legacy device via an AV block network, wherein each incoming PDU contains an AV stream identifier (which consists of a destination address and may also consist of a traffic class designation and/or higher level protocol identifiers). The destination address may identify a destination AV device within the AV block network. The AV switch may enable generation of outgoing PDUs by inserting or modifying a corresponding traffic class designation within each of the incoming PDUs. The AV switch may enable transmission using a specific traffic shaping process of each of the outgoing PDUs to a destination AV device within the AV block network based on the AV stream identifier and corresponding QoS parameters.

20 Claims, 6 Drawing Sheets

METHOD AND SYSTEM FOR PROXY A/V BRIDGING ON AN ETHERNET SWITCH

CROSS-REFERENCE TO RELATED APPLICATIONS/INCORPORATION BY REFERENCE

This application makes reference to, claims priority to, and claims the benefit of U.S. Provisional Application Ser. No. 60/917,870, filed on May 14, 2007, which is hereby incorporated herein by reference in its entirety.

FIELD OF THE INVENTION

Certain embodiments of the invention relate to communication networks. More specifically, certain embodiments of the invention relate to a method and system for proxy A/V bridging on an Ethernet switch.

BACKGROUND OF THE INVENTION

A/V Bridging (AVB) comprises a set of specifications, which define service classes (or AVB services) that enable the transport of audio/visual (A/V) streams (and/or multimedia streams) across an AVB-enabled network (or AVB network) based on selected quality of service (QoS) descriptors. Specifications, which enable the definition of AVB service classes, include the following.

A specification, which enables a set of AVB-enabled devices (or AVB devices) within an AVB network to exchange timing information. The exchange of timing information enables the devices to synchronize timing to a common system clock, which may be provided by a selected one of the AVB devices within the AVB network.

A specification, which enables an AVB destination device to register a request for delivery of a specified AV stream from an AVB source device. In addition, an AVB source device may request reservation of network resources, which enable the transmission of a specified AV stream. The Stream Reservation Protocol (SRP) defined within the specification provides a mechanism by which the AVB source device may register the request to reserve resources within the AVB network (such as bandwidth) to enable the transmission of the specified AV stream. The Multiple Multicast Registration Protocol (MMRP) may enable an AVB destination device to register the request for delivery of a specified AV stream.

A specification, which defines procedures by which AV streams are transported across the AVB network. These procedures may include methods for the queuing and/or forwarding of the AV streams by individual AVB devices within the AVB network.

A typical AVB network comprises a set of AVB devices, which are collectively referred to as an AVB block. An AVB network may comprise wired local area networks (LANs) and/or wireless LANs (WLANs), for example. Individual AVB devices within the AVB network may include AVB-enabled endpoint computing devices (such as laptop computers and WLAN stations), AVB-enabled switching devices (AV switches) within LANs and AVB-enabled access points (APs) within WLANs, for example. Within the AVB block, AV destination devices may request AV streams from AV source devices, which may be transported across the AVB network within specified latency target values as determined from the QoS descriptors associated with delivery of the AV stream.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for proxy A/V bridging on an Ethernet switch, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for proxy A/V bridging on an Ethernet switch. Various embodiments of the invention comprise a method and system by which non-AVB-enabled devices (or legacy devices) may utilize AVB services, for the transmission and/or reception of AV streams via an AVB network, which may not be available to legacy devices that communicate with conventional AVB networks.

Figure 1:
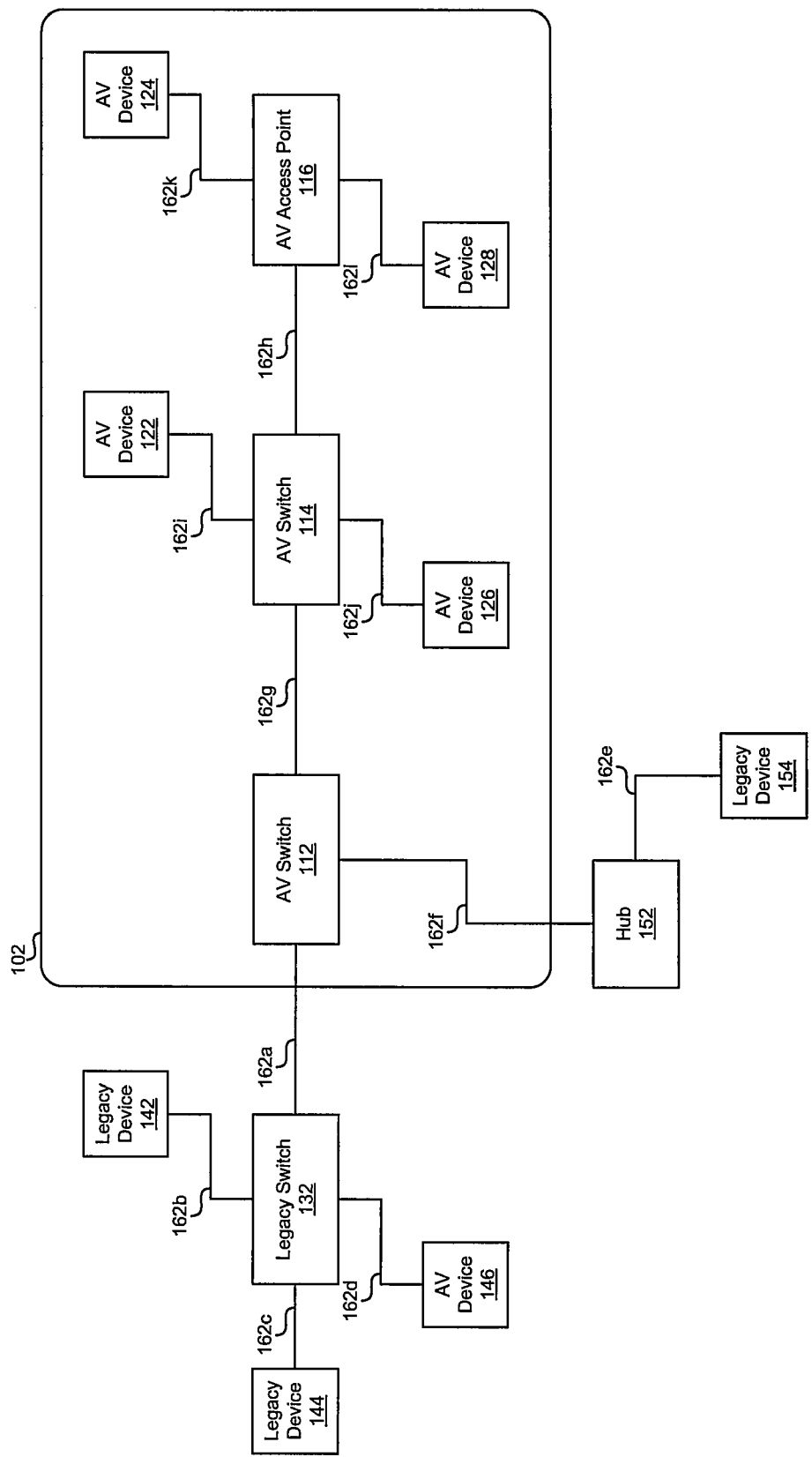
FIG. 1 is a diagram illustrating an exemplary AVB network, which may be utilized in connection with an embodiment of the invention.

FIG. 1 is a diagram illustrating an exemplary AVB network, which may be utilized in connection with an embodiment of the invention. Referring to FIG. 1, there is shown an AVB block 102, a legacy switch 132, a hub device 152, an AV device 146 and a plurality of legacy devices 142, 144 and 154. The AVB block 102 may comprise a plurality of AV switches 112 and 114, an AV access point (AP) 116 and a plurality of AV devices 122, 124, 126 and 128.

The legacy switch 132 may comprise suitable logic, circuitry and/or code that may enable capabilities associated with conventional data link layer switching, for example. The legacy switch 132 may not be configured to provide AVB services and may therefore be referred to as a non-AVB-enabled device. The legacy switch 132 may not be configured to enable the reservation of resources for the delivery of AV streams. The legacy switch 132 may not be configured to enable the queuing and/or forwarding of AV streams based on QoS descriptors. In an exemplary Ethernet network, the legacy switch 132 may enable the transport of Ethernet frames on a "best effort" QoS basis. With best effort QoS transport, the latency associated with the transport of a current Ethernet frame by the legacy switch 132 may differ from the latency associated with the transport of a subsequent Ethernet frame. When the legacy switch 132 receives frames from an isochronous AV stream, the variations in latency may produce unacceptable jitter or delay when the AV stream is delivered to a destination device.

The legacy device 142 may comprise suitable logic, circuitry and/or code that may enable capabilities associated with the transmission and/or reception of data link layer protocol data units (PDUs) to or from conventional data link layer networks, such as conventional Ethernet networks. The legacy device 142 may also be referred to as a non-AVB-enabled device. In an exemplary Ethernet network, the legacy device 142 may not be configured to exchange timing information with other Ethernet devices, or to synchronize timing to a common system clock with other Ethernet devices. The legacy device 142 may not be configured to register a request for the delivery of AV streams via an Ethernet network from a source device based on QoS descriptors. The legacy devices 144 and 154 may be substantially similar to the legacy device 142.

The AV switch 112 may comprise suitable logic, circuitry and/or code to enable AVB services within an AVB network. An exemplary AV switch 112 may be utilized in a wired LAN. The AV switch 114 may be substantially similar to the AV switch 112.

The AV AP 116 may comprise suitable logic, circuitry and/or code to enable AVB services within an AVB network. An exemplary AV AP 116 may be utilized in a WLAN and/or LAN.

The AV device 122 may comprise suitable logic, circuitry and/or code to utilize AVB services. An exemplary AV device 122 may comprise a computing device such as a laptop computer and/or WLAN station. In an exemplary Ethernet network, the AV device 122 may be configured to exchange timing information with other Ethernet devices and to synchronize timing to a common system clock with other Ethernet devices. The AV device 122 may be configured to register requests for the delivery of AV streams via an AVB network from a source device based on QoS descriptors. A particular set of QoS descriptors may be specified based on a traffic class designation, for example. The AV devices 124, 126, 128 and 146 may be substantially similar to the AV device 122.

The hub device 152 may comprise suitable logic, circuitry and/or code that may enable repeating of signals received from one interface to other interfaces coupled to the hub device 152. In an exemplary Ethernet network, the hub device 152 may enable signals received via the interface 162e to be transmitted via the interface 162f. A typical hub device 152 may enable coupling of a plurality of interfaces, for example, 4 interfaces, or 8 interfaces.

In an exemplary mode of operation, the legacy switch 132 may receive and/or transmit Ethernet frames via interfaces 162a, 162b, 162c and/or 162d, wherein each of the interfaces may be coupled to a distinct port within the legacy switch 132. The legacy switch 132 may communicate with the AV switch via interface 162a. The legacy switch 132 may communicate with the legacy device 142 via interface 162b. The legacy switch 132 may communicate with the legacy device 144 via interface 162c. The legacy switch 132 may communicate with the AV device 146 via interface 162d. The hub device 152 may communicate with the legacy device via interface 162e. The hub device 152 may communicate with the AV switch 112 via interface 162f. The hub device 152 may enable communication between the legacy device 154 and the AV switch 112. In a conventional Ethernet network, the legacy switch 132 may transfer Ethernet frames received via one of the interfaces and transmitted via one of the other interfaces on a best effort QoS basis. The Ethernet frames may comprise data from one or more AV streams.

The AV switch 112 may receive and/or transmit Ethernet frames via interfaces 162a, 162f and 162g, wherein each of the interfaces may be coupled to a distinct port within the AV switch 112. The AV switch 112 may communicate with the legacy switch 132 via interface 162a. The AV switch 112 may communicate with the hub device 152 via interface 162f. The AV switch 112 may communicate with the AV switch 114 via interface 162g. In a conventional AV network, the AV switch 112 may transfer Ethernet frames received and/or transmitted via one of the interfaces 162a or 162f on a best effort QoS basis. The AV switch 112 may utilize AVB services for the transfer of Ethernet frames received and/or transmitted via the interface 162g.

The AV switch 114 may receive and/or transmit Ethernet frames via interfaces 162g, 162h, 162i and 162j, wherein each of the interfaces may be coupled to a distinct port within the AV switch 114. The AV switch 114 may communicate with the AV switch 112 via interface 162g. The AV switch 114 may communicate with the AV AP 116 via interface 162h. The AV switch 114 may communicate with the AV device 122 via interface 162i. The AV switch 114 may communicate with the AV device 126 via interface 162j. The AV switch 114 may utilize AVB services for the transfer of Ethernet frames received via one of the interfaces and transmitted via one of the other interfaces.

The AV AP 116 may receive and/or transmit Ethernet frames via interfaces 162h, 162k and 162l, wherein each of the interfaces may be coupled to a distinct port within the AV AP 116. The AV AP 116 may communicate with the AV switch 114 via interface 162h. The AV AP 116 may communicate with the AV device 124 via interface 162k. The AV AP 116 may communicate with the AV device 128 via interface 162l. The AV AP 116 may utilize AVB services for the transfer of Ethernet frames received via one of the interfaces and transmitted via one of the other interfaces. The interfaces 162k and 162l may comprise RF communication channels utilized in WLAN systems, for example.

In a conventional AV network, the AV device 146, which is shown connected to the legacy switch 132 in FIG. 1, may be unable to utilize AVB services, which may be available to AV devices 122, 124, 126 and 128 within the AV block 102. Similarly, the legacy devices 142 and 144, which are shown as being connected to the legacy switch 132 in FIG. 1, and the legacy device 154, which is shown as being connected to the hub device 152, may also be unable to utilize AVB services, which may be available to AV devices within the AV block 102.

In various embodiments of the invention, an AV switch 112 within the AV block 102 may enable a legacy device 154, which is outside of the AV block 102, to utilize AVB services. This may occur when a port on the AV switch 112 communicates with a single device. As shown in FIG. 1, the port on the AV switch 112, which is coupled to the interface 162f, may communicate with a single device, that device being the legacy device 154 (via the hub device 152). In this aspect of the invention, while the legacy device 154 may remain a non-AVB-enabled device, the AV switch 112 may act as a proxy for the legacy device 154 within the AV block 102, thereby enabling the utilization of AVB services for the transport of AV streams, which are transmitted and/or received by the legacy device 154, within the AV block 102.

Figure 2:
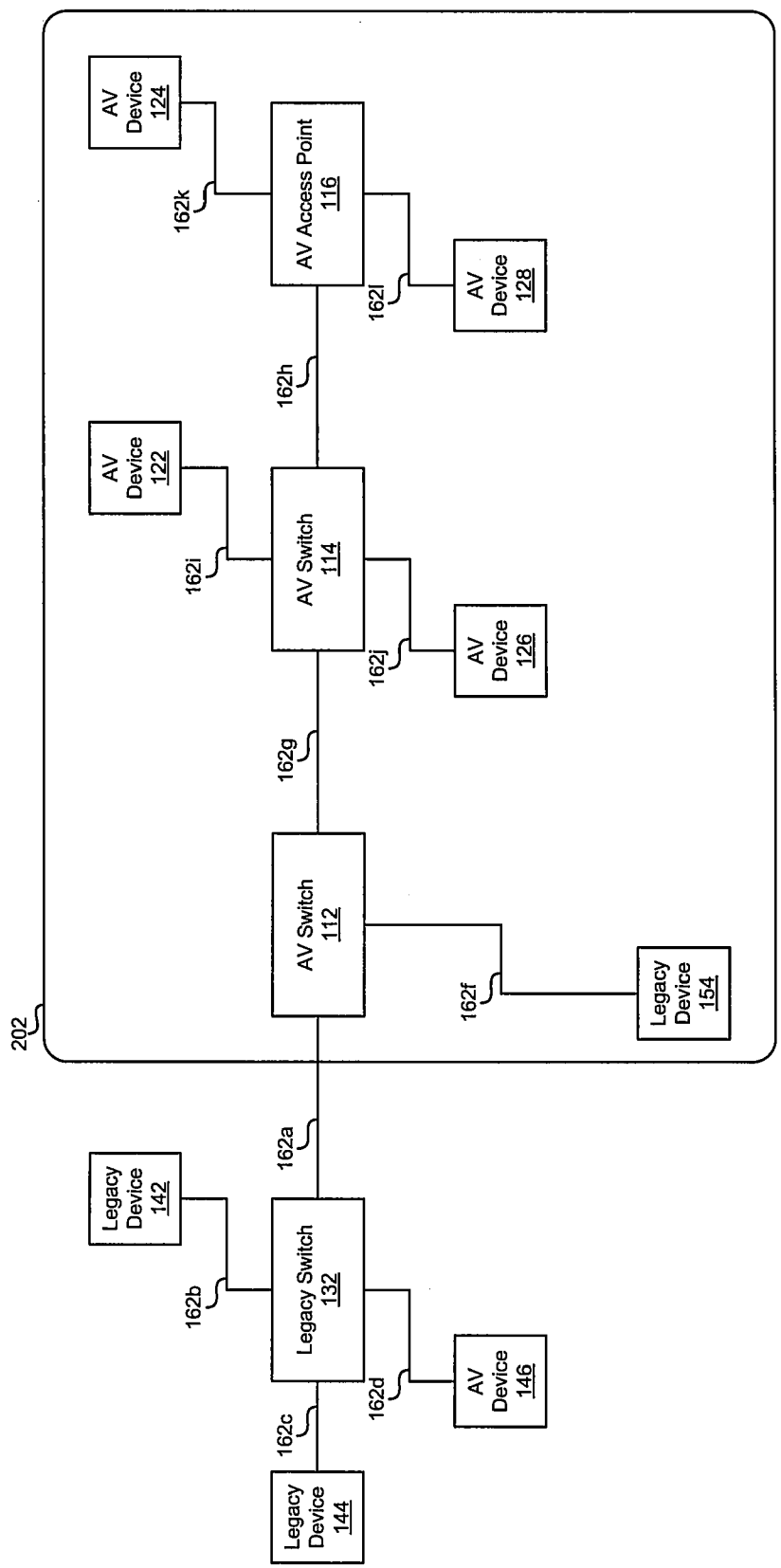
FIG. 2 is a diagram illustrating proxy A/V Bridging on an Ethernet switch, in accordance with an embodiment of the invention.

FIG. 2 is a diagram illustrating proxy A/V Bridging on an Ethernet switch, in accordance with an embodiment of the invention. Referring to FIG. 2, there is shown an AVB block 202, a legacy switch 132, an AV device 146 and legacy devices 142 and 144. The AVB block 202 may comprise a plurality of AV switches 112 and 114, an AV access point (AP) 116, a legacy device 154 and a plurality of AV devices 122, 124, 126 and 128.

In comparing FIG. 2, to FIG. 1, FIG. 2 shows a logical connection between the AV switch 112 and the legacy device 154 via the interface 162f. In this representation, the AV switch 112 acts as a proxy for the legacy device 154 within the AV block 202 via interface 162f, which enables the legacy device 154 to utilize AVB services within the AV block 202. Consequently, the legacy device 154 is shown as being within the AV block 202 in FIG. 2 via the logical connection to the interface 162f.

In various embodiments of the invention, AV devices, AV switches and/or AV APs associate within an AV block 202 based on the exchange of discovery protocol (e.g. "Logical Link Discovery Protocol": LLDP) messages, which may be periodically transmitted from the respective devices. The discovery protocol messages describe the attributes of the device, which is sending the message. For example, the AV device 122 may transmit discovery protocol messages, which describe the attributes of the AV device 122 via interface 162i. Similarly, the AV device 124 may transmit discovery protocol messages, which describe the attributes of the AV device 124 via interface 162k. The AV switch 114 may transmit discovery protocol messages, which describe the attributes of the AV switch 114 via interfaces 162g, 162h, 162i and 162j. The AV switch 112 may receive discovery protocol messages from the AV switch 114 via interface 162g. The AV AP 116 may receive discovery protocol messages from the AV switch 114 via interface 162h. The AV device 122 may receive discovery protocol messages from the AV switch 114 via the interface 162i. The AV device 126 may receive discovery protocol messages from the AV switch 114 via interface 162j. The AV switch 114 may receive discovery protocol messages from the AV switch 122 via interface 162g. The AV switch 114 may receive discovery protocol messages from the AV AP 116 via interface 162h. The AV switch 114 may receive discovery protocol messages from the AV device 122 via interface 162i. The AV switch 114 may receive discovery protocol messages from the AV device 126 via interface 162j.

An AVB-enabled device may send discovery protocol messages, which may comprise a "time-synch" capable attribute and an AV-capable attribute. An AVB-enabled device, which receives a discovery protocol message, which comprises the time-synch-capable attribute and AV-capable attribute via a port, may label the port to be an "AVB" port. At an AV device 122, 124, 126 or 128, the labeling of the port to be an AVB port may enable the AV device to utilize AVB services within the AV block 202. At an AV switch 112 or 114, or at an AV AP 116, the labeling of a port as an AVB port may enable the port to be utilized for AVB services. The AV devices, which are reachable via the port, may be referred to as "participating" devices. The participating devices may utilize AVB services within the AV block 202.

Within the AV block 202, a plurality of ports at various AV switches 112 or 114, or at the AV AP 116 may enable the formation of paths between AV devices within the AV block 202. For example, a path between the participating AV device 122 and the participating AV device 124 may comprise interface 162i, the AV switch 114, interface 162h, the AV AP 116 and the interface 162k. When the ports located at the AV switch 114, which are connected to the interfaces 162i and 162h, and the port located at the AV AP 116, which are connected to the interfaces 162h and 162k are each labeled to be an AVB port, then a path may exist within the AV block 202, which may enable the transport of AV streams between the participating AV device 122 and the participating AV device 124.

In conventional AVB networks, an AVB-enabled device, which does not receive a discovery protocol message that comprises the time-synch-capable attribute and the AV-capable attribute via a port, may label the port to be a "legacy" port. Labeling of a port within an AVB-enabled device as a legacy port may disable AVB services at the port.

In various embodiments of the invention, however, a legacy device 154 may send a discovery protocol message to a port located within an AV switch 112, which comprises a "proxy request" attribute. In the exemplary AV block 202 shown in FIG. 2, the AV switch 112 may receive the discovery protocol messages from the legacy device 154 at a port within the AV switch 112, which is coupled to the interface 162f. Receipt of the discovery protocol messages may enable proxy services at the port within the AV switch 112 when the AV switch 112 detects that a single Ethernet-addressable device is reachable via the port. The AV switch 112 may determine whether a single Ethernet-addressable device is reachable via the port by inspecting the source address fields within received Ethernet frames, for example. When the Ethernet frames received at a port within the AV switch 112 comprise a source address field, which references a single Ethernet address, the AV switch 112 may determine that a single Ethernet-addressable device is reachable via the port.

By providing proxy services to the legacy device 154, the AV switch 112 may enable the legacy device 112 to utilize AVB services within the AV block 202. The legacy device, which is reachable via the port, may be referred to as a "semi-participating" device. The semi-participating legacy device 154 may utilize AVB services within the AV block 202, even if the semi-participating legacy device 154 is not enabled to request specific AVB services. In this aspect of the invention, the AV switch 112 may request the AVB services on behalf of the semi-participating legacy device 154.

In one aspect of the invention, the AV switch 112 may provide proxy services on behalf of the legacy device 154 by enabling time synchronization between the legacy device 154 and the system clock utilized within the AV block 202. In various embodiments of the invention, the AV switch 112 may perform the timing synchronization when the legacy device 154 is acting as a source device, which transmits AV streams to one or more destination devices within the AV block 202, for example the AV device 122.

In various embodiments of the invention, the proxy AV switch 112 may time synchronize the AV streams transmitted by the legacy device 154 to the receiving AV device 122 by providing traffic shaping services for particular AV stream transmitted by the legacy device 154. The particular AV stream may be determined by a specific combination of destination address, priority tag, and higher-level protocol information (e.g., IP port number). The particular traffic shaping rules may be determined by the QoS information obtained from a reservation protocol, utilized in various embodiments of the invention, or by examining the received traffic and estimating the QoS information. The traffic shaping of the Ethernet frames may enable the AVB network to transport the Ethernet frames along a path within the AV block 202 such that the latency of the transport along the path is within specified latency target values. For example, the path from the legacy device 154 to the AV device 122 may comprise interface 162f, the AV switch 112, interface 162g, the AV switch 114 and interface 162*i*. Along the path, the AV switch 112 may utilize the QoS information to determine the process for the queuing and forwarding of Ethernet frames received via the interface 162*f* and forwarded via the interface 162*g*. Similarly, the AV switch 114 may utilize the QoS information to determine the process for the queuing and forwarding of Ethernet frames received via the interface 162*g* and forwarded via the interface 162*i*.

Since the legacy device 154 is not synchronized to a common system clock within the AV block 202, jitter within the AV stream transmitted from the legacy device 154 to the AV device 122 may be greater than may be the case when the path is between two AV devices, for example an AV device 122 which transmits an AV stream to the AV device 124. In this aspect of the invention, the AV switch 112 may reduce the jitter in Ethernet frames received from the legacy device 154, measured at the interface 162*f*, by providing the traffic shaping services described above.

In various embodiments of the invention, in which the legacy device 154 transmits AV streams which do not utilize AV Bridging services, for example when legacy device 154 transmits a standard RTP (real time protocol) stream, the AV stream may be transported across the AV block 202 utilizing legacy timing mechanisms.

In another aspect of the invention, the AV switch 112 may provide proxy services on behalf of the legacy device 154 by enabling registration of requests for delivery of AV streams from an AVB source device, when the legacy device 154 is a destination for the AV stream. When the legacy device 154 is a source for the AV stream, the AV switch 112 may enable sending of requests for the reservation of resources within the AV block 202 on behalf of the legacy device 154.

When the legacy device 154 is a source for the AV stream, the AV switch 112 may detect Ethernet frames received from the legacy device 154. Based on the detections, the AV switch 112 may generate a traffic profile for the AV streams. For example, the AV switch 112 may determine that the generated traffic profile for the received AV stream may correspond to an RTP profile for an MPEG-2 stream. Based on the generated traffic profile, the AV switch 112 may generate a set of reservation parameters, for example QoS descriptors. The AV switch 112 may then generate a reservation request message (e.g., "Stream Reservation Protocol": SRP, or "Multiple Stream Reservation Protocol": MSRP) on behalf of the legacy device 154, which incorporates the generated set of reservation parameters. The AV switch 112 may propagate the generated reservation message among AVB-enabled devices within the AV block 202.

In various embodiments of the invention, when the legacy device 154 is capable of generating a reservation request message on its own behalf, the legacy device 154 may send the reservation request message to the AV switch 112 via the interface 162*f*. When the legacy device 154 is a semi-participating device, the AV switch 112 may propagate the received reservation message among AVB-enabled devices within the AV block 202.

When the legacy device 154 is a destination for the AV stream, the AV switch 112 may detect Ethernet frames, which are being forwarded to the legacy device 154. Based on the detections, the AV switch 112 may generate a traffic profile for the AV streams. Based on the generated traffic profile, the AV switch 112 may generate a set of QoS descriptors. The AV switch 112 may then generate a registration request message on behalf of the legacy device 154, which incorporates the generated set of QoS descriptors. The AV switch 112 may then propagate the generated registration request message among AVB-enabled devices within the AV block 202.

In various embodiments of the invention, when the legacy device 154 is capable of generating a registration request message on its own behalf, the legacy device 154 may send the registration request message to the AV switch 112 via the interface 162*f*. When the legacy device 154 is a semi-participating device, the AV switch 112 may propagate the received registration request message among AVB-enabled devices within the AV block 202.

Figure 3:
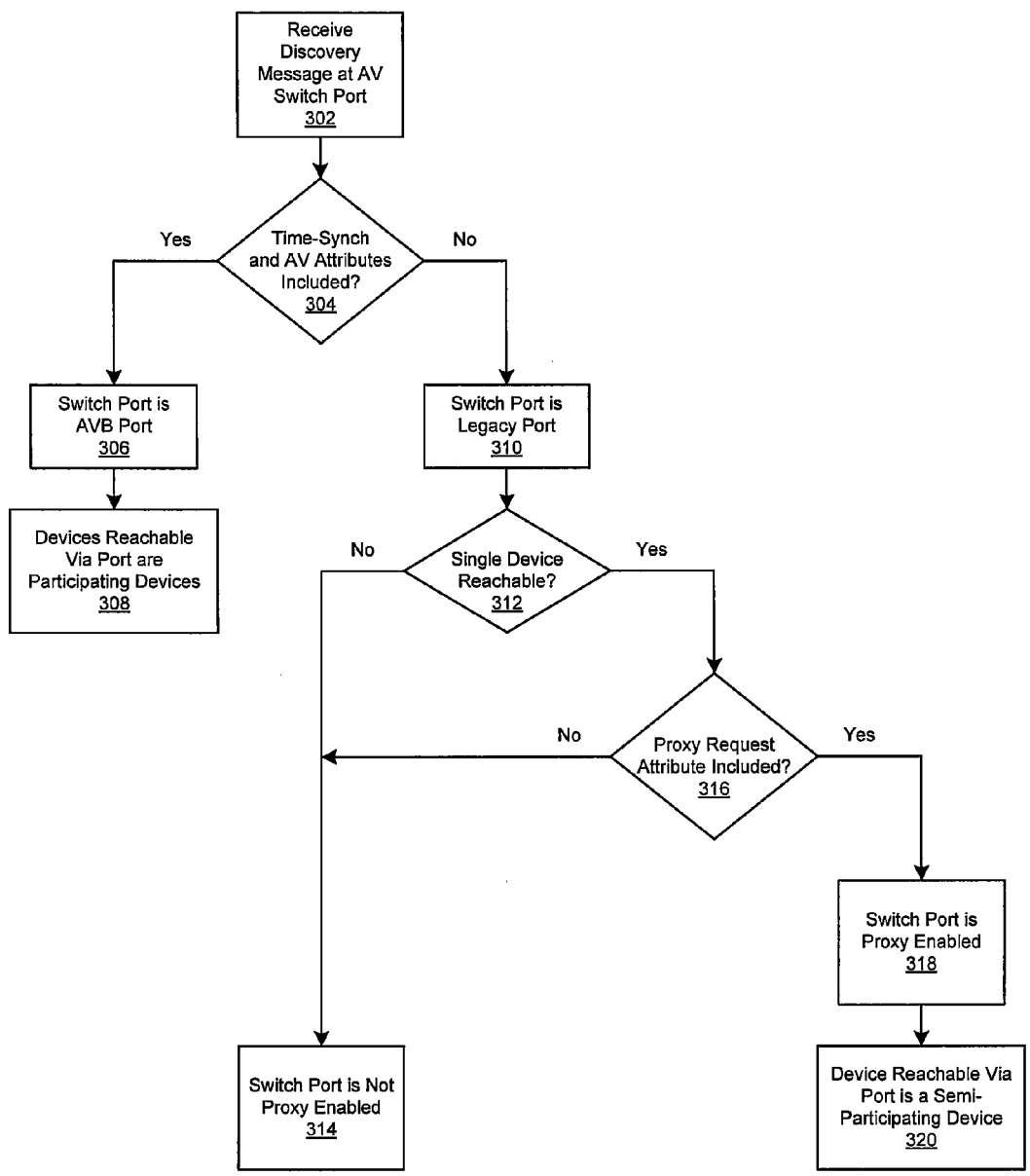
FIG. 3 is a flowchart illustrating exemplary steps for enabling proxy A/V Bridging on an Ethernet switch, in accordance with an embodiment of the invention.

FIG. 3 is a flowchart illustrating exemplary steps for enabling proxy A/V Bridging on an Ethernet switch, in accordance with an embodiment of the invention. Referring to FIG. 3, in step 302, a discovery protocol message may be received at port within an AV switch 112. Step 304 may determine whether the discovery protocol message includes time-synch and AV attributes. When step 304 determines that the attributes may be present in the received discovery protocol message, in step 306, the switch port may be labeled an AVB port. In step 308, devices reachable via the port may be determined to be participating devices within an AVB block 202.

When step 304 determines that the time-synch and AV attributes may not be present in the received discovery protocol message, in step 310, the switch port may be labeled a legacy port. Step 312 may determine whether a single Ethernet-addressable device may be reachable via the labeled legacy port. When step 312 determines that more than a single device is reachable via the labeled legacy port, in step 314, the switch port may be determined to be not proxy enabled.

When step 312 determines that a single Ethernet-addressable device may be reachable via the labeled legacy port, step 316 may determine whether a proxy request attribute was included in the received discovery protocol message. When step 316 determines that a proxy request attribute was not included in the received discovery protocol message, step 314 may follow.

When step 316 determines that a proxy request attribute was included in the discovery protocol message, step 318 may determine that the switch port is to be proxy enabled. In step 320, the device reachable via the port may be determined to be a semi-participating device.

Figure 4:
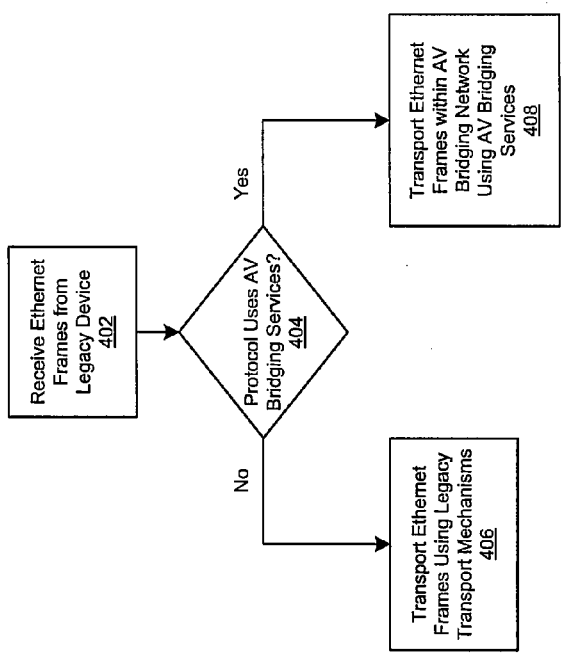
FIG. 4 is a flowchart illustrating exemplary steps for time synchronizing AV streams at a proxy device, in accordance with an embodiment of the invention.

FIG. 4 is a flowchart illustrating exemplary steps for time synchronizing AV streams at a proxy device, in accordance with an embodiment of the invention. Referring to FIG. 4, in step 402 an AV switch 112 may receive Ethernet frames from a legacy device 154. The Ethernet frames may comprise portions of an AV stream generated by an application within the legacy device 154. Step 404 may determine whether the protocol executing within the legacy device 154 utilizes AVB services. When step 404 determines that the protocol does not utilize AVB services, in step 406, the AV switch 112 may transport the Ethernet frames using legacy transport mechanisms.

When step 404 determines that the protocol does utilize AVB services, in step 408, the AV switch 112 may transport the Ethernet frames within the AV block 202 utilizing AVB services. The AV switch 112 may apply traffic shaping rules specified by the QoS parameters for the AV stream before transporting the Ethernet frames within the AV block 202. The AV switch 112 may identify the AV stream by a destination address and/or higher layer information. The QoS parameters may be determined based on a reservation protocol. The QoS parameters may be determined by examining the received Ethernet frames, which may enable identification of a potential AV stream and measurement of timing of Ethernet frames received in the potential AV stream to determine jitter and bandwidth estimates.

Figure 5:
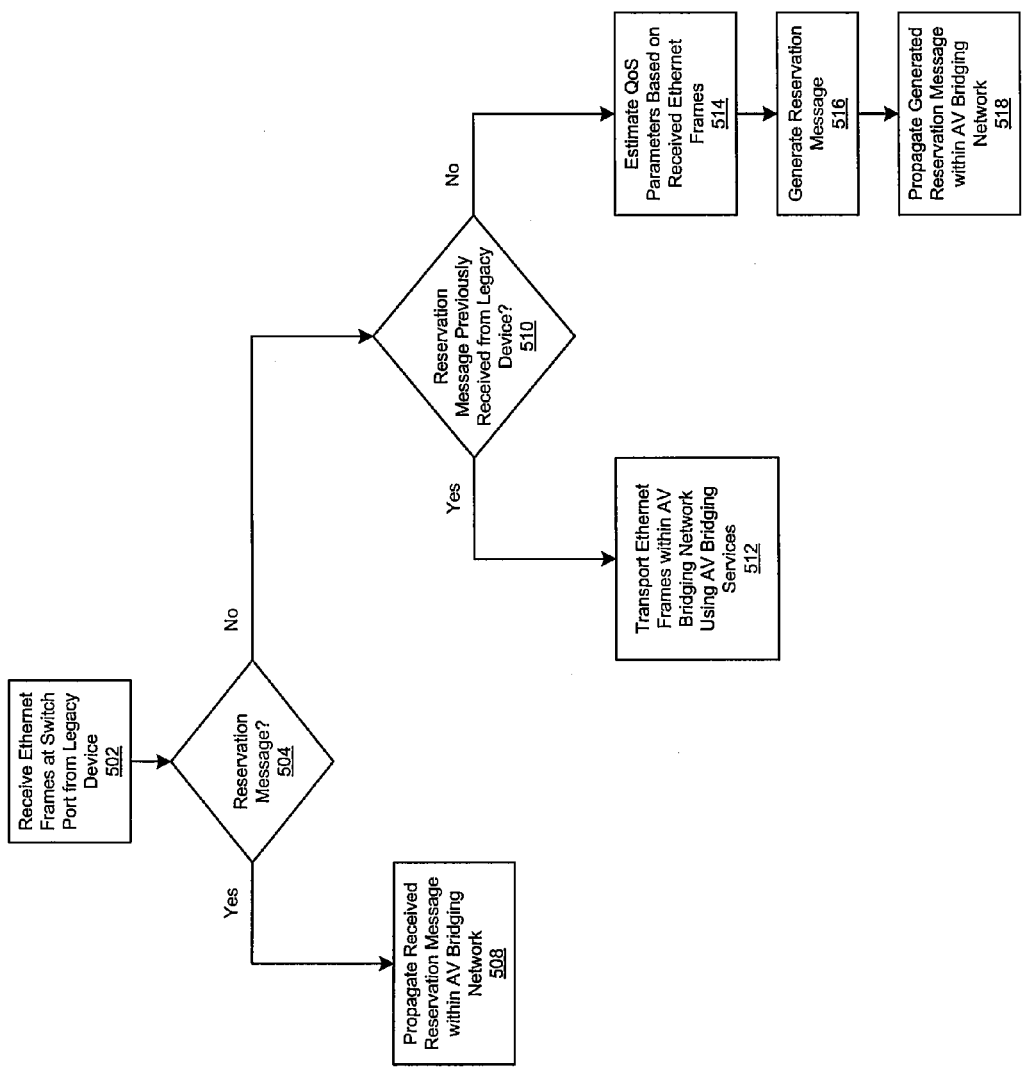
FIG. 5 is a flowchart illustrating exemplary steps for transporting AV streams from a legacy device to an AVB network via a proxy AVB-enabled device, in accordance with an embodiment of the invention.

FIG. 5 is a flowchart illustrating exemplary steps for transporting AV streams from a legacy device to an AVB network via a proxy AVB-enabled device, in accordance with an embodiment of the invention. FIG. 5 presents an exemplary method by which an AV switch 112 may forward AV streams within an AV block 202, utilizing AVB services, on behalf of a legacy device 154. In FIG. 5, the legacy device 154 may be assumed to be a semi-participating device. Referring to FIG. 5, in step 502, the AV switch 112 may receive Ethernet frames from the legacy device 154. The Ethernet frames may comprise portions of data from the AV stream. Step 504 may determine whether a received Ethernet frame contains a reservation message. When the AV switch 112 receives a reservation message from the legacy device 154, in step 508, the AV switch 112 may propagate the received reservation message within the AV block 202.

When step 504 determines that the received Ethernet frames do not contain a reservation message, in step 510, the AV switch 112 may determine whether the legacy device 154 had previously sent a reservation message. When the AV switch 112 determines, in step 510, that the legacy device 154 had previously sent a reservation message, in step 512, the AV switch 112 may transport the received Ethernet frames within the AV block 202 using AVB services. The AV switch 112 may provide traffic shaping services for the Ethernet frames before transporting the Ethernet frames within the AV block 202. The AV switch 112 may also insert a traffic class designation or change an existing traffic class designation within the Ethernet frames prior to transporting the Ethernet frames within the AV block 202.

When the AV switch 112 determines, in step 510, that the legacy device had not previously sent a reservation message, in step 514, the AV switch 112 may detect AV streams and estimate QoS descriptors based on the headers and content of Ethernet frames received from the legacy device 154. The estimated QoS descriptors may account for jitter and bandwidth usage detected in the received Ethernet frames from the legacy device 154. In step 516, the AV switch 112 may generate a reservation message on behalf of the legacy device 154 based on the estimated QoS descriptors. In step 518, the AV switch 112 may propagate the generated SRP reservation message within the AV block 202.

Figure 6:
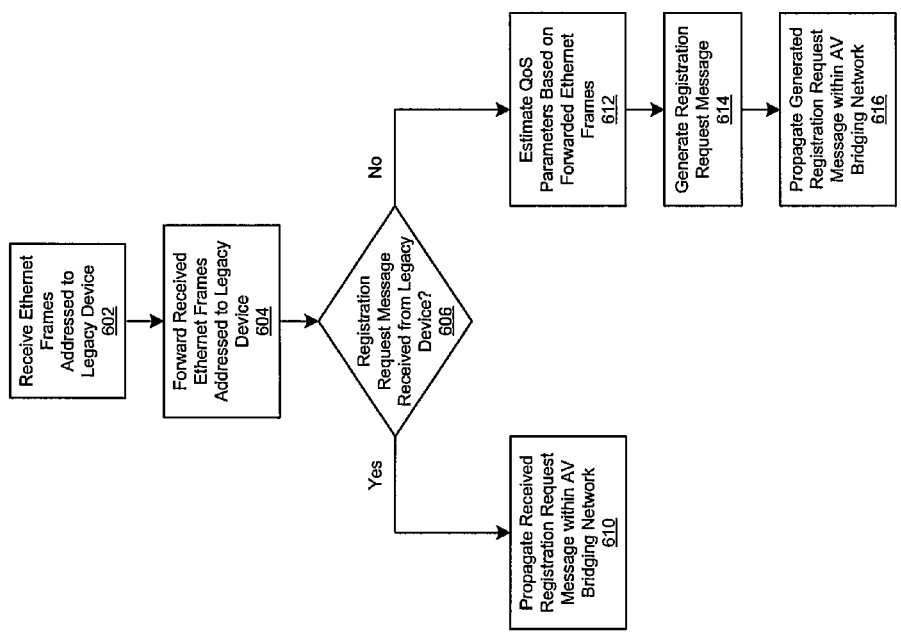
FIG. 6 is a flowchart illustrating exemplary steps for delivery of AV streams to a legacy device to an AVB network via a proxy AVB-enabled device, in accordance with an embodiment of the invention.

FIG. 6 is a flowchart illustrating exemplary steps for delivery of AV streams to a legacy device to an AVB network via a proxy AVB-enabled device, in accordance with an embodiment of the invention. FIG. 6 presents an exemplary method by which an AV switch 112 may utilize AVB services to forward AV streams from an AVB-enabled device within an AV block 202 to a legacy device 154. In FIG. 6, the legacy device 154 may be assumed to be a semi-participating device. Referring to FIG. 6, in step 602, the AV switch 112 may receive Ethernet frames, which are addressed for delivery to the legacy device 154. The Ethernet frames may comprise portions of data from the AV stream. In step 604, the received Ethernet frames may be forwarded to the legacy device 154. Step 606 may determine whether the AV switch 112 has received a registration request message (e.g: "Multiple Multicast Registration Protocol": MMRP) from the legacy device 154. When the AV switch 112 determines, in step 606, that a registration request message has been received from the legacy device 154, in step 610, the AV switch 112 may propagate the received registration request message within the AV block 202.

When the AV switch 112 determines, in step 606, that a registration request message has not been received from the legacy device 154, in step 612, the AV switch 112 may estimate QoS descriptors based on the Ethernet frames forwarded to the legacy device 154. In step 614, the AV switch 112 may generate a registration request message on behalf of the legacy device 154. In step 616, the AV switch 112 may propagate the generated registration request message within the AV block 202.

Aspects of a system for proxy A/V bridging on an Ethernet switch may comprise an AV switch 112, which enables reception of incoming PDUs from a legacy device 154 via an AV block network 202, wherein each incoming PDU contains an AV stream identifier. The AV stream identifier consists of a destination address, traffic class identifier, and may also include a higher level protocol identifier (such as IP port number). The destination address may identify a destination AV device 122 within the AV block network 202. The AV switch 112 may enable generation of outgoing PDUs by inserting or modifying a corresponding traffic class designation within each of the incoming PDUs. The AV switch 112 may enable transmission of each of the outgoing PDUs to a destination AV device 122 within the AV block network 202 based on the AV stream identifier.

The AV switch 112 enables generation or modification of the corresponding traffic class designation based on a reservation message received from the legacy device 154. The AV switch 112 may enable transmission to propagate the received reservation message within the AV block network 202.

The AV switch 112 may enable generation of QoS descriptors based on the incoming PDUs received from the legacy device 154. The AV switch 112 may enable estimation of timing jitter and bandwidth of the received AV streams, where the AV streams may be identified based on address, traffic class, and/or higher level identifiers of incoming PDUs. The generated QoS descriptors may be adjusted based on the estimated timing jitter and bandwidth. The AV switch 112 may enable generation of a reservation message for an AV stream based on the generated QoS descriptors. The AV switch 112 may enable transmission to propagate the generated reservation message within the AV block network 202. The AV switch 112 may enable generation or modification of the corresponding traffic class designation based on the generated reservation message.

Aspects of a system for proxy AN bridging on an Ethernet switch may comprise an AV switch 112 receiving discovery protocol messages via a port. The AV switch may label the port based on the contents of the received discovery protocol message. The AV switch 112 may determine whether a communicating device, such as a legacy device 154, may utilize AVB services for transmitting and/or receiving PDUs via the port based on the labeling.

The communicating device may be enabled to utilize AVB services via the port when the discovery protocol message comprises a time-synchronization-enabled attribute and an AV-enabled attribute. The port may be labeled as a legacy port when the discovery protocol message does not comprise a time-synchronization-enabled attribute and an AV-enabled attribute. When the port is labeled as a legacy port, a legacy device 154 may be enabled to utilize AVB services via the port when the discovery protocol message comprises a proxy request attribute. The port may be labeled as a proxy enabled port when the discovery protocol message comprises the proxy request attribute. A single legacy device 154 may transmit and/or receive PDUs via the labeled proxy enabled port.

Another embodiment of the invention may provide a machine-readable storage, having stored thereon, a computer program having at least one code section executable by a machine, thereby causing the machine to perform the steps as described herein for proxy A/V bridging on an Ethernet switch.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communicating data, the method comprising:
   in a first communication device:
      receiving a one or more link discovery messages via a port;
      labeling said port based on the contents of said received one or more link discovery messages; and
      determining whether said first communication device may utilize AV Bridging (AVB) services for transmitting and/or receiving protocol data units via said port based on said labeling and based on a quantity of second communication devices that are reachable via said port, wherein:
         said port is labeled as a legacy port when said received one or more link discovery messages indicate that a said second communication device reachable via said port is not AVB-enabled; and
         said first communication device is enabled to utilize said AV Bridging services via said port when said received one or more link discovery messages comprise a proxy request.

2. The method according to claim 1, wherein said port is labeled as a proxy enabled port when said received one or more link discovery messages comprise a proxy request.

3. The method according to claim 2, wherein a single said second communication device transmits and/or receives protocol data units via said labeled proxy enabled port.

4. A system for communicating data, the system comprising:
   one or more circuits for use in a first communication device, wherein said one or more circuits enable:
      reception of one or more link discovery messages via a port;
      labeling of said port based on the contents of said received one or more link discovery messages; and
      determination of whether said first communication device may utilize AV Bridging (AVB) services for transmitting and/or receiving protocol data units via said port based on said labeling and based on a quantity of second communication devices that are reachable via said port, wherein:
         said port is labeled as a legacy port when said received one or more link discovery messages indicate that a said second communication device reachable via said port is not AVB-enabled; and
         said communication device is enabled to utilize said AV Bridging services via said port when said received one or more link discovery messages comprise a proxy request.

5. The system according to claim 4, wherein said port is labeled as a proxy enabled port when said received one or more link discovery messages comprise a proxy request.

6. The system according to claim 5, wherein a single said second communicating device transmits and/or receives said protocol data units via said labeled proxy enabled port.

7. A method for communicating data, the method comprising:
   receiving a link discovery message via a port;
   labeling said port based on the contents of said received link discovery message; and
   determining whether a communication device may utilize AV Bridging services for transmitting and/or receiving protocol data units via said port based on said labeling, wherein:
      said port is labeled as a legacy port when said link discover message does not comprise a time-synchronization-enabled attribute and an AV-enabled attribute; and
      said communication device is enabled to utilize said AV Bridging services via said port when said link discovery message comprises a proxy request attribute and when said port is labeled as said legacy port.

8. The method according to claim 7, wherein said port is labeled as a proxy enabled port when said link discovery message comprises said proxy request attribute.

9. The method according to claim 8, wherein a single said communication device transmits and/or receives said protocol data units via said labeled proxy enabled port.

10. A system for communicating data, the system comprising:
    one or more circuits that enable reception of a link discovery message via a port;
    said one or more circuits enable labeling of said port based on the contents of said received link discovery message; and
    said one or more circuits enable determination of whether a communication device may utilize AV Bridging services for transmitting and/or receiving protocol data units via said port based on said labeling, wherein:
       wherein said port is labeled as a legacy port when said link discover message does not comprise a time-synchronization-enabled attribute and an AV-enabled attribute; and
       said communication device is enabled to utilize said AV Bridging services via said port when said link discovery message comprises a proxy request attribute and when said port is labeled as said legacy port.

11. The system according to claim 10, wherein said port is labeled as a proxy enabled port when said link discovery message comprises said proxy request attribute.

12. The system according to claim 11, wherein a single said communication device transmits and/or receives said protocol data units via said labeled proxy enabled port.

13. The method according to claim 1, wherein, if said port is labeled as a legacy port, said first communication device performs the following upon receiving, via said port, at least one protocol data unit of a data stream being communicated between a second communication device and a third communication device:
- generating a traffic class designation for said data stream; and
- inserting said traffic class designation within one or more protocol data units of said data stream prior to transmitting said one or more protocol data units.

14. The method according to claim 1, comprising:
- receiving, via said port, at least one protocol data unit of a data stream being communicated between a second communication device and a third communication device;
- generating quality of service (QoS) parameters for said data stream; and
- sending one or more messages to reserve network resources for communicating said data stream, wherein said network resources are determined based on said quality of service parameters.

15. The method according to claim 14. wherein said one or more messages are generated and transmitted in accordance with the Stream Reservation Protocol or the Multiple Multicast Reservation Protocol.

16. The method according to claim 14, comprising:
estimating timing jitter of said data stream; and
adjusting said generated QoS parameters based on said estimated timing jitter.

17. The system according to claim 4, wherein, if said port is labeled as a legacy port, said first communication device performs the following upon receiving, via said port, at least one protocol data unit of a data stream being communicated between a second communication device and a third communication device:
- generating a traffic class designation for said data stream; and
- inserting said traffic class designation within one or more protocol data units of said data stream prior to transmitting said one or more protocol data units.

18. The system according to claim 4, wherein said one or more circuits enable:
- receiving, via said port, at least one protocol data unit of a data stream being communicated between a second communication device and a third communication device;
- generating quality of service (QoS) parameters for said data stream; and
- sending one or more messages to reserve network resources for communicating said data stream, wherein said network resources are determined based on said quality of service parameters.

19. The system according to claim 18. wherein said one or more messages are generated and transmitted in accordance with the Stream Reservation Protocol or the Multiple Multicast Reservation Protocol.

20. The system according to claim 18, comprising:
estimating timing jitter of said data stream; and
adjusting said generated QoS parameters based on said estimated timing jitter.

* * * * *